United States Patent
Liu

(10) Patent No.: US 11,204,633 B2
(45) Date of Patent: Dec. 21, 2021

(54) METHOD FOR PROTECTING OPERATION OF SERVER BACKBOARD

(71) Applicant: ZHENGZHOU YUNHAI INFORMATION TECHNOLOGY CO., LTD., Henan (CN)

(72) Inventor: Tao Liu, Henan (CN)

(73) Assignee: ZHENGZHOU YUNHAI INFORMATION TECHNOLOGY CO., LTD., Henan (CN)

( * ) Notice: Subject to any disclaimer, the term of this patent is extended or adjusted under 35 U.S.C. 154(b) by 580 days.

(21) Appl. No.: 16/097,057

(22) PCT Filed: Sep. 7, 2017

(86) PCT No.: PCT/CN2017/100850
§ 371 (c)(1),
(2) Date: Oct. 26, 2018

(87) PCT Pub. No.: WO2018/205473
PCT Pub. Date: Nov. 15, 2018

(65) Prior Publication Data
US 2021/0223844 A1    Jul. 22, 2021

(30) Foreign Application Priority Data

May 10, 2017 (CN) .......................... 201710326867.X

(51) Int. Cl.
*G06F 1/30* (2006.01)
*G06F 1/28* (2006.01)
(Continued)

(52) U.S. Cl.
CPC ................ *G06F 1/305* (2013.01); *G06F 1/28* (2013.01); *G06F 11/0796* (2013.01); *G06F 11/3058* (2013.01)

(58) Field of Classification Search
CPC ... G06F 1/26; G06F 1/266; G06F 1/28; G06F 1/30; G06F 1/305; G06F 1/3203;
(Continued)

(56) References Cited

U.S. PATENT DOCUMENTS

| 7,661,005 | B2* | 2/2010 | Spengler | .............. | G11B 33/126 |
| | | | | | 713/330 |
| 7,843,083 | B2* | 11/2010 | Chang | ........................ | H02J 9/06 |
| | | | | | 307/65 |

(Continued)

FOREIGN PATENT DOCUMENTS

| CN | 204156500 U | 2/2015 |
| CN | 105680677 A | 6/2016 |

(Continued)

OTHER PUBLICATIONS

Ytterdal, T., et al. "Device Modeling for Analog and RF CMOS Circuit Design". John Wiley & Sons, Ltd. 2003. ISBN:0-471-49869-6. (Year: 2003).*

(Continued)

*Primary Examiner* — Thomas J. Cleary
(74) *Attorney, Agent, or Firm* — Yue (Robert) Xu; Apex Attorneys at Law, LLP

(57) ABSTRACT

A method for protecting operation of a server backboard is provided. The method includes: establishing an adaptive setting mechanism for an overcurrent protection point of the server backboard, where a backboard operation overcurrent protection unit is established on a server mainboard and is configured to acquire load information of a current backboard and adjust, based on the load information, an overcurrent protection point of a power supply path provided by the mainboard to the backboard; establishing an automatic current limiting mechanism applied in a case where the (Continued)

backboard is in an overcurrent state; and establishing a server backboard abnormality control unit.

6 Claims, 2 Drawing Sheets

(51) Int. Cl.
  *G06F 11/07* (2006.01)
  *G06F 11/30* (2006.01)
(58) Field of Classification Search
  CPC .............. G06F 1/3268; G06F 11/0796; G06F 11/3058; G06F 11/3062; G06F 13/4068; G06F 13/4081
  See application file for complete search history.

(56) References Cited

U.S. PATENT DOCUMENTS

| | | | |
|---|---|---|---|
| 9,535,472 B1* | 1/2017 | Maroney | H02J 1/08 |
| 10,824,219 B2* | 11/2020 | Wu | G11B 19/209 |
| 10,928,879 B2* | 2/2021 | Guo | G06F 11/2053 |
| 10,936,033 B2* | 3/2021 | Liao | H02H 3/05 |
| 10,944,289 B2* | 3/2021 | Calvin | H02J 4/00 |
| 2006/0133001 A1* | 6/2006 | Van Den Berg | H02H 9/004 361/93.1 |
| 2007/0177322 A1* | 8/2007 | Jacobs | H03F 3/217 361/100 |
| 2009/0147393 A1* | 6/2009 | Hakamata | G06F 1/3268 360/69 |
| 2016/0182039 A1* | 6/2016 | Xiao | H03K 17/18 307/115 |
| 2016/0254741 A1* | 9/2016 | Andersson | G05F 1/573 323/284 |
| 2017/0170655 A1* | 6/2017 | Nguyen | H03K 17/08122 |

FOREIGN PATENT DOCUMENTS

| | | |
|---|---|---|
| CN | 106502364 A | 3/2017 |
| CN | 106951051 A | 7/2017 |

OTHER PUBLICATIONS

"LTC4218 Hot Swap Controller". Linear Technology Corp. Feb. 2016. (Year: 2016).*
Power Management, China's Electronic Commerce ( Basic Electronics ), Mar. 31, 2008.
International Search Report and Written Opinion from International Application No. PCT/CN2017/100850, dated Feb. 9, 2018.

* cited by examiner

METHOD FOR PROTECTING OPERATION OF SERVER BACKBOARD

The present application is the national phase of PCT International Patent Application PCT/CN2017/100850, filed on Sep. 7, 2017 which claims the priority to Chinese Patent Application No. 201710326867.X, titled "METHOD FOR PROTECTING OPERATION OF SERVER BACKBOARD ", filed on May 10, 2017 with the Chinese Patent Office, both of which are incorporated herein by reference in their entireties.

FIELD

The present disclosure relates to the field of servers, and in particular to a method for protecting operation of a server backboard.

BACKGROUND

A server backboard is connected to all hard disks of a system, and it is important for the server backboard to operate reliably to ensure the stability of data service. After the server backboard is shipped from the factory, the server backboard is required to operate stably for a long time in various complicated environments, such as a high temperature environment and a high humidity environment and a high noise environment. In this case, a strict requirement is imposed on the operation protection for the server backboard. During the operation of the server backboard, reliable protection measures are required, and it is required to timely recognize and process an abnormality generated during the operation of the server backboard, so as to ensure the stable operation of the server system.

Currently, during the operation of the server backboard, in a case where the server backboard has a fault, such as overcurrent of a power supplying current and over temperature of a local area, the server backboard is not protected effectively and adaptively, and thus cases such as burnt board and data loss may be caused, resulting in a large impact on the stability of the overall system. At present, only a fuse is added to the power supplying input end of the server backboard for protection. The conventional method for protecting operation of a server backboard has some advantages. The protection method using a fixed fuse can only be applied in a specific case that a short-circuited current is generated. In a case where the abnormal current is lower than the short-circuited current, the fault cannot be effectively recognized and thus the protection cannot be performed. In addition, due to the variety of hard disks, the different number of installed hard disks, and the different current protection requirements, the current protection method for the server backboard using the fuse is too simple, and the protection point cannot be automatically adjusted based on the change of the load. In this case, there is a risk of burning the board, and the security of the flexible configuration of the system cannot be ensured. Since the server backboard operates in complicated environments, the PCB may gradually degrade due to changes of the environments, which may cause the temperature at a local position of the PCB of the server backboard to rise rapidly. If the problem is not processed timely, the board may be burned out, which may result in abnormality of the overall system, and even result in downtime of the system, thus the reliability of the system cannot be ensured.

SUMMARY

In order to solve the above problems in the conventional technology, a method for protecting operation of a server backboard is provided in the present disclosure, which includes:

establishing an adaptive setting mechanism for an overcurrent protection point of the server backboard, where a backboard operation overcurrent protection unit is established on a server mainboard and is configured to acquire load information of a current backboard and adjust, based on the load information, an overcurrent protection point of a power supply path provided by the mainboard to the backboard;

establishing an automatic current limiting mechanism applied in a case where the backboard is in an overcurrent state, where a D electrode and an S electrode of a power MOS are connected in series to a system on the server mainboard, and a voltage between a G electrode and the D electrode of the power MOS is controlled to cause the power MOS to operate in a half-conductive state, and a part of energy of the system is consumed by the power MOS, to limit a current to be less than a current triggering the overcurrent protection point, so as to protect the system in advance; and establishing a server backboard abnormality control unit, where the server backboard abnormality control unit is arranged on the server backboard and is configured to individually control power supplying to each of hard disks by controlling the power MOS arranged at a power supply input end of the hard disk to be turned on or turned off.

Preferably, the establishing an adaptive setting mechanism for an overcurrent protection point of the server backboard includes:

establishing the backboard operation overcurrent protection unit on the server mainboard, where the backboard operation overcurrent protection unit is configured to acquire load information of a current backboard and adjust, based on the load information, an overcurrent protection point of a power supply path provided by the mainboard to the backboard;

establishing a hard disk number monitoring unit on the server backboard, where the hard disk number monitoring unit is configured to monitor a change of the number of hard disks of the system in a real time manner by monitoring a change of a GND signal at an interface for each of the hard disks, where in a case where the hard disk is not in place, the GND signal at the interface for the hard disk has a high level, and in a case where the hard disk is in place, the GND signal at the interface for the hard disk has a low level;

transmitting, by the hard disk number monitoring unit, the number of in-place hard disks to the backboard operation overcurrent protection unit on the mainboard, to acquire in-place load information of the entire hard disk backboard;

adding maximum operating currents of the in-place hard disks with each other to obtain a sum, and multiplying the sum by a protection margin coefficient of 1.5, to obtain a current optimal overcurrent protection point; and automatically adjusting the overcurrent protection point by adjusting a resistance of a sampling resistor in a protection circuit.

Preferably, the establishing an automatic current limiting mechanism applied in a case where the server backboard is in an overcurrent state includes:

connecting the D electrode and the S electrode of the power MOS in series to the system on the server mainboard, where if the backboard operation overcurrent protection unit detects that a current provided by the mainboard to the backboard exceeds a sum of maximum operating currents and is less than a value obtained by multiplying the sum of the maximum operating currents by a protection margin coefficient of 1.5, the system operates in a high risk state; and controlling the voltage between the G electrode and the D electrode of the power MOS if the high risk state lasts for one second or more, to cause the power MOS to operate in the half-conductive state, where a part of energy of the system is consumed by the power MOS, to limit the current to be less than the current triggering the overcurrent protection point, so as to protect the system in advance.

Preferably, the establishing a server backboard abnormality control unit includes:

arranging the server backboard abnormality control unit on the server backboard, where the server backboard abnormality control unit is configured to individually control power supplying to each of hard disks by controlling the power MOS arranged at a power supply input end of the hard disk to be turned on or turned off;

arranging two temperature sensors at each of the hard disks on the hard disk backboard; and reading, in a real time manner, by the server backboard abnormality control unit, a value of each of the temperature sensors arranged on the server backboard, and actively cutting off, by the server backboard abnormality control unit, power supplying of the path to the power MOS at a local position in a case where a temperature at the local position changes too fast, to isolate an abnormal area, so as to avoid the abnormality of the server backboard.

Preferably, the establishing a server backboard abnormality control unit further includes:

automatically monitoring, by the server backboard abnormality control unit, a change of a temperature at the position with an abnormal temperature at a preset time interval;

restoring, by the server backboard abnormality control unit, the power supplying to the power MOS at the abnormal area, to attempt automatic power-on of the system, if the temperature is returned to a normal value; and maintaining, by the server backboard abnormality control unit, the power MOS at the abnormal area to be powered off if the power MOS still does not operate normally after the attempting is performed for a preset number of times.

Preferably, after maintaining the power MOS at the abnormal area to be powered off, the method further includes:

transmitting information that the power MOS does not operate normally to a BMC of the mainboard via an I2C bus.

As can be seen from the above technical solutions, the present disclosure has the following advantages.

In the method for protecting operation of a server backboard, an adaptive overcurrent protection mechanism is established for the server backboard, to automatically adjust the overcurrent protection point based on a load in an accessed system, so as to achieve adaptive protection control for the server backboard. A server backboard abnormality control unit is established to read the value of each of the temperature sensors arranged on the server backboard in a real time manner, and actively cut off the power supplying of the path to the power MOS at a local position in a case where a temperature at the local position changes too fast, to isolate an abnormal area, thereby avoiding the abnormality of the server backboard, thus ensuring the reliability of the system.

BRIEF DESCRIPTION OF THE DRAWINGS

In order to more clearly illustrate technical solutions of the present disclosure, drawings to be used in the description of the embodiments are briefly described below. It is apparent that the drawings in the following description show only some embodiments of the present disclosure, and other drawings may be obtained by those skilled in the art from the drawings provided herein without any creative work.

DETAILED DESCRIPTION OF EMBODIMENTS

In order to make objects, features and advantages of the present disclosure clearer and easier to be understood, technical solutions according to the present disclosure are clearly and completely described below in conjunction with the embodiments and the drawings. It is apparent that the embodiments described hereinafter are only some embodiments of the present disclosure, rather than all the embodiments. All other embodiments obtained by those skilled in the art based on the embodiments in the present disclosure without any creative work fall into the protection scope of the present disclosure.

Figure 1:
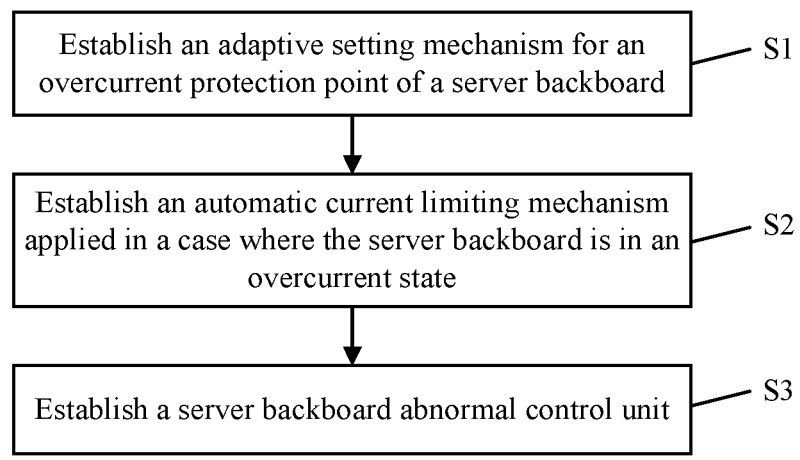
FIG. 1 is a flowchart showing a method for protecting operation of a server backboard.
Figure 2:
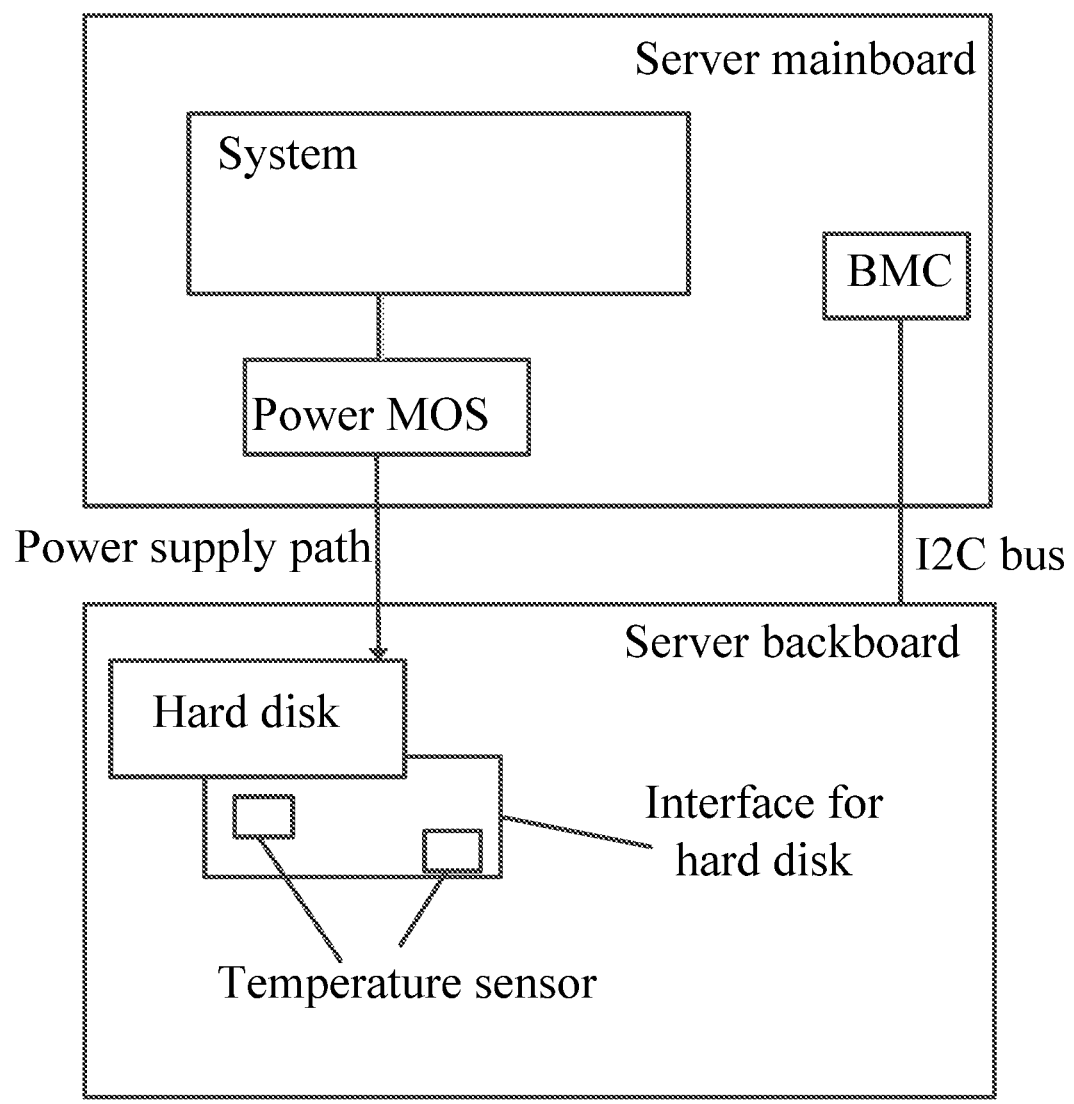
FIG. 2 shows the server mainboard and server backboard according to an embodiment of the present disclosure.

A method for protecting operation of a server backboard is provided according to an embodiment of the present disclosure. As shown in FIG. 1, the method includes the following steps S1 to S3.

In step S1, an adaptive setting mechanism for an overcurrent protection point of the server backboard is established. A backboard operation overcurrent protection unit is established on a server mainboard, and is configured to: acquire load information of a current backboard, and adjust, based on the load information, an overcurrent protection point of a power supply path provided by the mainboard to the backboard.

In step S2, an automatic current limiting mechanism applied in a case where the server backboard is in an overcurrent state is established. A D electrode and an S electrode of a power MOS are connected in series to a system on the server mainboard, and a voltage between a G electrode and the D electrode of the power MOS is controlled to cause the power MOS to operate in a half-conductive state. A part of energy of the system is consumed by the power MOS, to limit a current to be less than a current triggering the overcurrent protection point, so as to protect the system in advance.

In step S3, a server backboard abnormality control unit is established. The server backboard abnormality control unit is arranged on the server backboard and is configured to individually control power supplying to each of hard disks by controlling the power MOS arranged at a power supply input end of the hard disk to be turned on or turned off.

In this embodiment, the establishing an adaptive setting mechanism for an overcurrent protection point of the server backboard may be performed in the following way. The backboard operation overcurrent protection unit is established on the server mainboard using an atmega128L chip. The backboard operation overcurrent protection unit reads information from a hard disk number monitoring unit on the hard disk backboard via an I2C bus to acquire load information of a current backboard, and adjust, based on the load information, an overcurrent protection point of a power supply path provided by the mainboard to the backboard. A hard disk number monitoring unit is established on the server backboard. The hard disk number monitoring unit monitors a change of the number of hard disks of the system in a real time manner by monitoring a change of a GND signal at an interface for each of the hard disks. The hard disk number monitoring unit transmits the number of in-place hard disks to the backboard operation overcurrent protection unit on the mainboard, to acquire in-place load information of the entire hard disk backboard. Maximum operating currents of the in-place hard disks are added with each other to obtain a sum, and the sum is multiplied by a protection margin coefficient of 1.5, to obtain a current optimal overcurrent protection point. The overcurrent protection point is automatically adjusted by adjusting a resistance of a sampling resistor in a protection circuit, specifically, by using a variable resistor of I2C.

In this embodiment, the establishing an automatic current limiting mechanism applied in a case where the server backboard is in an overcurrent state may be performed in the following way. The D electrode and the S electrode of the power MOS are connected in series to the system on the server mainboard. If the backboard operation overcurrent protection unit detects that a current provided by the mainboard to the backboard exceeds a sum of maximum operating currents and is less than a value obtained by multiplying the sum of the maximum operating currents by a protection margin coefficient of 1.5, the system operates in a high risk state. If the high risk state lasts for one second or more, the power MOS operates in a half-conductive state by controlling the voltage between the G electrode and the D electrode of the power MOS to be half of an original voltage. A part of energy of the system is consumed by the power MOS, to limit the current to be less than a current triggering the overcurrent protection point, so as to protect the system in advance.

In this embodiment, the establishing a server backboard abnormality control unit may be performed in the following way. The server backboard abnormality control unit is arranged on the server backboard. The server backboard abnormality control unit individually controls power supplying to each of hard disks by controlling the power MOS arranged at a power supply input end of the hard disk to be turned on or turned off. Two temperature sensors of TMP 112 are arranged at each of the hard disks on the hard disk backboard. The server backboard abnormality control unit reads a value of each of the temperature sensors arranged on the server backboard in a real time manner, and actively cuts off power supplying of the path to the power MOS at a local position in a case where a temperature at the local position changes too fast, to isolate an abnormal area, so as to avoid the abnormality of the server backboard.

The server backboard abnormality control unit automatically monitors a change of a temperature at the position with an abnormal temperature at a preset time interval. If the temperature is returned to a normal value, the server backboard abnormality control unit restores the power supplying to the power MOS at the abnormal area, to attempt automatic power-on of the system. If the power MOS still does not operate normally after the attempting is performed for a preset number of times, the server backboard abnormality control unit maintains the power MOS at the abnormal area to be powered off. Information that the power MOS does not operate normally is transmitted to a BMC of the mainboard via the I2C bus, to inform a user that the abnormality occurs and the server backboard is required to be replaced or repaired as soon as possible, thereby achieving intelligent maintenance for the system. The preset time interval is preferably 5 to 10 seconds. The preset number of times is preferably 3 to 5 times.

With the method for protecting operation of a server backboard, the board docking protection can be implemented, thereby not only meeting the reliability requirement, but also achieving the efficient requirement, thus achieving the reliability and stability of the server system.

Based on the above illustration of the disclosed embodiments, those skilled in the art can implement or carry out the present disclosure. Various modifications to the embodiments are apparent to those skilled in the art, and the general principle herein can be implemented in other embodiments without departing from the spirit or scope of the present disclosure. Therefore, the present disclosure is not limited to the embodiments described herein, but should accord with the broadest scope consistent with the principle and novel features disclosed herein.

The invention claimed is:

1. A method for protecting operation of a server backboard, comprising:
   acquiring load information of a current backboard and adjusting, based on the load information, an overcurrent protection point of a power supply path provided by the mainboard to the backboard;
   connecting a D electrode and an S electrode of a power MOS in series to a system on the server mainboard, wherein the power MOS is arranged at a power supply input end of each of hard disks;
   controlling a voltage between a G electrode and the D electrode of the power MOS to consume a part of energy of the system by the power MOS, to limit a current to be less than a current triggering the overcurrent protection point, so as to protect the system in advance; and
   individually controlling, for each of the hard disks, power supplying to the hard disk by controlling the power MOS arranged at the power supply input end of the hard disk to be turned on or turned off,
   wherein the acquiring load information of a current backboard and adjusting, based on the load information, an overcurrent protection point of a power supply path provided by the mainboard to the backboard comprises:
   monitoring a change of a number of in-place hard disks of the system in a real time manner;
   transmitting the number of in-place hard disks to the mainboard, to acquire in-place load information of an entire hard disk backboard;
   adding maximum operating currents of the in-place hard disks with each other to obtain a sum, and multiplying the sum by a protection margin coefficient, to obtain a current optimal overcurrent protection point; and
   automatically adjusting the overcurrent protection point by adjusting a resistance of a sampling resistor in a protection circuit.

2. The method for protecting operation of a server backboard according to claim 1,
   wherein the change of the number of hard disks of the system is monitored by monitoring a change of a GND signal at an interface for each of the hard disks, wherein in a case where the hard disk is not in place, the GND signal at the interface for the hard disk has a high level, and in a case where the hard disk is in place, the GND signal at the interface for the hard disk has a low level;
   the protection margin coefficient is 1.5.

3. The method for protecting operation of a server backboard according to claim 1, wherein:
   if detecting that a current provided by the mainboard to the backboard exceeds a sum of maximum operating currents and is less than a value obtained by multiplying the sum of the maximum operating currents by a protection margin coefficient of 1.5, the system operates in a high risk state; and the controlling a voltage between a G electrode and the D electrode of the power MOS comprises:

controlling the voltage between the G electrode and the D electrode of the power MOS, if the high risk state lasts for one second or more, to consume a part of energy of the system by the power MOS, to limit the current to be less than the current triggering the overcurrent protection point, so as to protect the system in advance.

4. The method for protecting operation of a server backboard according to claim 1, further comprising:

arranging two temperature sensors at each of the hard disks on the hard disk backboard; and reading, in a real time manner a value of each of the temperature sensors arranged on the backboard, and actively cutting off, in a case where a temperature of an area changes at a speed exceeding a threshold, power supply to the power MOS located in the area to isolate the area, so as to avoid the abnormality of the server backboard.

5. The method for protecting operation of a server backboard according to claim 4, further comprising:

automatically monitoring a change of the temperature at the area at a preset time interval;

restoring the power supplying to the power MOS at the area, to perform automatic power-on of the system, if the temperature is returned to a preset value; and maintaining power-off of the power MOS at the area if the power MOS still does not operate normally after the automatic power-on of the system is performed for a preset number of times.

6. The method for protecting operation of a server backboard according to claim 5, wherein after maintaining power-off of the power MOS at the area, the method further comprises:

transmitting information that the power MOS does not operates normally to BMC of the mainboard via an I2C bus.

* * * * *